United States Patent
Goldberg et al.

(10) Patent No.: US 6,753,513 B2
(45) Date of Patent: Jun. 22, 2004

(54) PROPELLER DE-ICING SYSTEM

(75) Inventors: Joshua Goldberg, Woodbridge, CT (US); David Arel, Granby, CT (US)

(73) Assignee: Hamilton Sundstrand, Windsor Locks, CT (US)

(*) Notice: Subject to any disclaimer, the term of this patent is extended or adjusted under 35 U.S.C. 154(b) by 0 days.

(21) Appl. No.: 10/392,346

(22) Filed: Mar. 19, 2003

(65) Prior Publication Data

US 2003/0178412 A1 Sep. 25, 2003

Related U.S. Application Data

(60) Provisional application No. 60/365,598, filed on Mar. 19, 2002.

(51) Int. Cl.[7] .............................. B64D 15/12; H05B 1/02
(52) U.S. Cl. ..................... 219/497; 219/201; 244/134 D
(58) Field of Search ............................... 219/201, 200, 219/497, 494, 510; 244/134 D

(56) References Cited

U.S. PATENT DOCUMENTS

| | | | | |
|---|---|---|---|---|
| 4,021,008 A | * | 5/1977 | Eichenauer | 244/134 D |
| 4,036,457 A | * | 7/1977 | Volkner et al. | 244/134 D |
| 4,277,672 A | * | 7/1981 | Jones | 219/497 |
| 4,386,749 A | * | 6/1983 | Sweet et al. | 244/134 D |
| 4,514,619 A | * | 4/1985 | Kugelman | 219/483 |
| 6,137,082 A | * | 10/2000 | Pruden et al. | 219/201 |
| 6,194,685 B1 | * | 2/2001 | Rutherford | 219/201 |
| 6,237,874 B1 | * | 5/2001 | Rutherford et al. | 244/134 E |

FOREIGN PATENT DOCUMENTS

| | | | |
|---|---|---|---|
| EP | 680878 | * | 11/1995 |
| FR | 2726148 | * | 4/1996 |
| GB | 2243412 | * | 10/1991 |
| GB | 2291575 | * | 1/1996 |
| JP | 2-249798 | * | 10/1990 |
| JP | 2-296273 | * | 12/1990 |
| JP | 7-2189 | * | 1/1995 |

\* cited by examiner

Primary Examiner—John A. Jeffery
(74) Attorney, Agent, or Firm—Carlson, Gaskey & Olds

(57) ABSTRACT

A propeller de-icing system (20) includes heaters (30, 32) associated with propeller blades (22, 24). A controller (34) uses ambient temperature information from a sensor (36), for example. The heaters (30, 32) preferably comprise a material having a known coefficient of resistivity. The controller (34) utilizes the coefficient of resistivity information and determines the temperature of the heaters based upon determining the resistance of the heaters. With the inventive system, the heater control is based upon the ambient temperature and a determination of the desired heater resistance corresponding to a desired heater temperature.

21 Claims, 2 Drawing Sheets ial Appli-
PROPELLER DE-ICING SYSTEM

CROSS REFERENCE TO RELATED APPLICATIONS

This application claims priority to U.S. Provisional Application No. 60/365,598, which was filed on Mar. 19, 2002.

BACKGROUND OF THE INVENTION

This invention generally relates to propeller de-icing systems.

Aircraft propellers are typically deiced by heating the accreting surface of the propeller blades. Electrical resistance heaters typically provide the heat. The heaters raise the surface temperature of the blade (when the blade is covered by some amount of ice) until the bond between the ice and the blade surface is significantly weakened. The forces associated with the propeller rotation shears the bond between the ice and the propeller blade such that the ice is removed.

It is important in propeller de-icing systems to not melt the ice to avoid water runback onto portions of the blade that are not protected by heaters. Conventional arrangements suffer from the drawback that they tend to melt ice, which introduces the possibility for water runback onto the unprotected portions of the propeller blades.

In order to avoid melting ice with conventional arrangements, heater power levels are minimized. In very cold conditions, sufficient ice must built up to insulate the heater surface before the temperature at the interface between the propeller blade and the ice increases sufficiently to weaken the bond and remove the ice. Anticipated propeller performance under these icing conditions is reduced because of the relatively significant build-up of ice.

A significant drawback to conventional arrangements is that they typically merely control heater on and off times. This provides constant power for constant input voltage because conventional arrangements use heaters having resistance that is stable with variations in temperature. Energy delivered to the heaters is roughly proportional to the time that power is applied. Conventional methods of propeller de-icing turn on power to a blade heater for a controlled time. For low ambient temperatures, the time is generally longer than for warmer ambient temperatures.

There is a need for an improved propeller de-icing system that improves propeller performance by reducing the amount of ice build-up and, moreover, avoids the possibility for water runback onto portions of the propeller blade that are not heated. This invention addresses that need while avoiding the shortcomings and drawbacks of the prior art.

SUMMARY OF THE INVENTION

In general terms, this invention is a propeller de-icing system that utilizes ambient temperature information and resistance information regarding the heater to control heater operation.

One example system designed according to this invention includes a propeller having a plurality of blades. Heaters are associated with the blades. The heaters have a coefficient of resistance that provides a predictable relationship between heater temperature and the resistance of the heater. An electronic control unit determines a desired heater temperature, based upon the ambient temperature. The controller then powers the heater and monitors the heater resistance until the resistance corresponds to the desired heater temperature.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
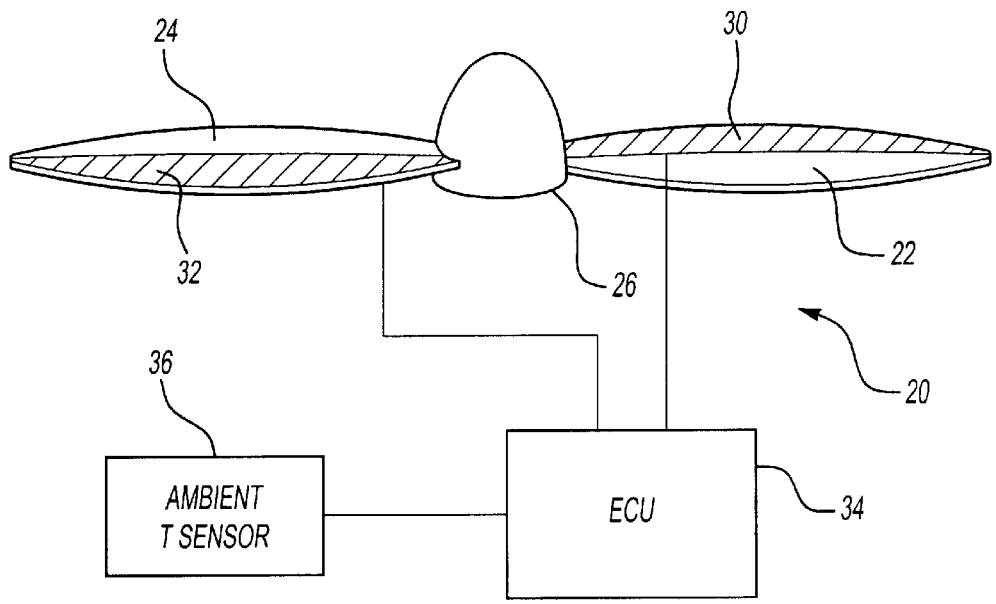
FIG. 1 schematically illustrates a propeller de-icing system designed according to this invention.

FIG. 1 schematically shows a propeller de-icing system 20. The example propeller 26 has blades 22 and 24. This invention is not limited to any particular number of propeller blades.

Each of the blades 22 and 24 includes a heater element 30, 32. The heater elements are supported on the blades in a conventional manner. The heater elements 30 and 32 in the example embodiment comprise a material having a predetermined temperature coefficient of resistivity that provides a predictable relationship between heater temperature and heater resistance. The coefficient of resistivity of the heater material is used to monitor the average change in temperature of the heater.

An example material that has such a coefficient of resistivity is chemically pure nickel. Those skilled in the art who have the benefit of this description will be able to select an appropriate material to meet the needs of their particular situation.

The blades 22 and 24 are considered a single zone so that the heaters 30 and 32 are controlled simultaneously according to one example implementation of this invention. Having opposite pairs of blade heaters controlled simultaneously avoids imbalanced conditions were ice is on one blade that is opposite from another.

An electronic control unit 34 controls the operation of the heaters 30 and 32. The controller 34 receives temperature information from an ambient temperature sensor 36. The temperature sensor 36 may be any conventional sensor capable of detecting ambient air temperature. The temperature sensor 36 may be supported at any convenient location on the aircraft so that the controller 34 obtains the necessary ambient temperature information.

In one example, the temperature sensor is a standard platinum sense resistor. Other example temperature sensors include non-linear thermistors and silicon resistors. Those skilled in the art who have the benefit of this description will be able to select the appropriate sensor device to meet the needs of their particular situation.

The controller 34 determines a desired change in the heater temperature based upon the ambient temperature. The controller 34 controls the power to bring the heater temperature to a desired level by monitoring the resistance of the heater using the predetermined relationship between heater resistance and heater temperature which is based upon the coefficient of resistivity of the heater material. Once the desired heater temperature is achieved as indicated by the heater resistance, the controller 34 turns off the heaters.

One significant advantage of this invention is that it minimizes or avoids the possibility for melting ice yielding water that may tend to run back onto portions of the propeller blades 22, 24 that are not protected by heater elements. Turning off the power to the heaters once the desired temperature is reached reduces the likelihood of melting ice in a manner that allows for water runback onto unprotected portions of the blades.

Figure 2:
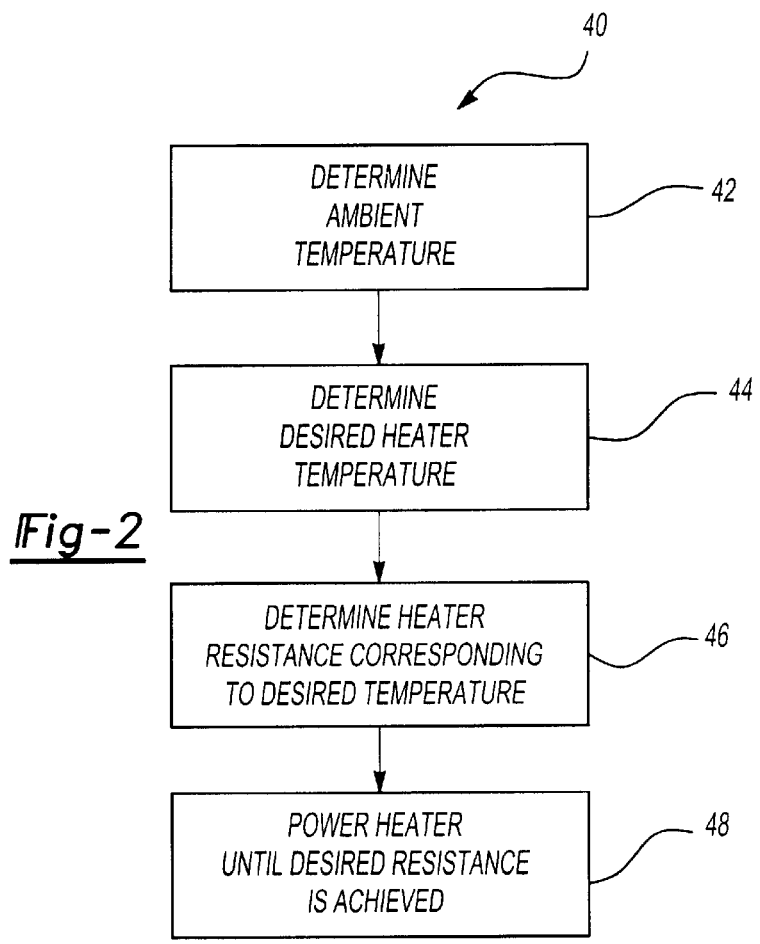
FIG. 2 is a flowchart diagram summarizing a control strategy of the embodiment of FIG. 1.

FIG. 2 includes a flowchart 40 that summarizes a method of de-icing a propeller according to this invention. At the first step 42, the ambient temperature is determined. At 44 the desired heater temperature is determined based upon the ambient temperature information. Using a predetermined relationship based upon the coefficient of resistivity of the heater material, the heater resistance corresponding to the desired temperature is determined at 46. At 48 the heater is powered until the desired resistance is achieved, which yields the desired heater temperature.

The controller 34 is programmed to achieve desired system performance. Those skilled in the art who have this description will be able to suitably program a commercially available microprocessor or computer to perform the functions of the controller 34.

Figure 3:
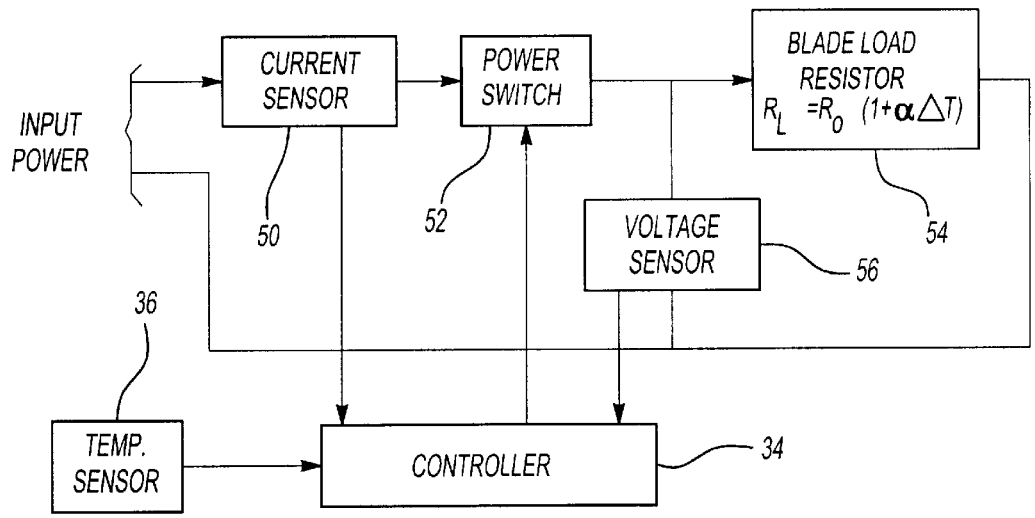
FIG. 3 schematically illustrates selected portions of one example embodiment of this invention.
Figure 4:
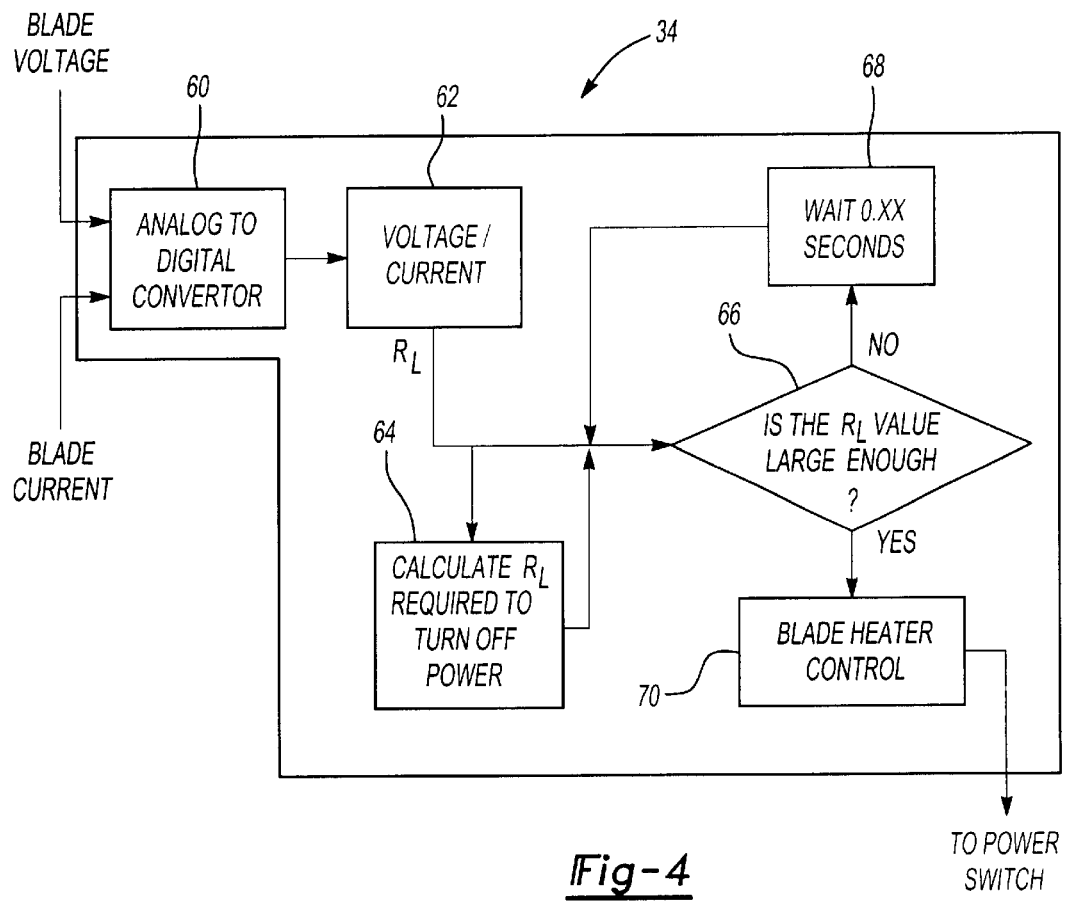
FIG. 4 schematically illustrates an example control strategy useful with the embodiment of FIG. 3.

Referring to FIGS. 3 and 4, a particular example implementation of this invention will be described. For this example assume that the final heater temperature is 150° F. and the ambient temperature is −10° F. Under these circumstances, a heater temperature change of 160° F. is required to achieve sufficient de-icing.

The controller 34 uses the information from the temperature sensor 36 to make the ambient temperature determination.

A current sensor 50 measures the current provided to the heaters 30, 32. In one example, the current sensor is a series resistor and the voltage drop across the resistor provides the current level information. In another example, a Hall device is used as the current sensor 50. Another example includes a current transformer that measures AC current. Those skilled in the art who have the benefit of this description and the particulars of the nature of the power delivered to the heater of their particular arrangement will be able to select the device for the current sensor 50 that meets the needs of their particular situation.

A power switch 52 responds to commands from the controller 34 and controls power supply to the heaters. In one example, the power switch 52 comprises a field effect transistor (FET). Other examples include solid state switches such as insulated gate bipolar transistors, bipolar transistors, silicon controlled rectifiers (SCR) and triac switches within a full wave bridge rectifier. The particular type of power switch selected will depend upon the needs of a particular situation.

A blade load resistor 54 schematically represents the resistance of at least one of the heaters 30 or 32 on the corresponding blade. In one example where a zone is heated, the average resistance of the heaters in the zone is used as the controlling resistance.

A voltage sensor 56 determines the voltage drop across the blade load resistor 54 (i.e., the heater) and provides that information to the controller 34. In one example, a resistor-based voltage divider network (not illustrated) is used to reduce the magnitude of the voltage applied by the power switch to the heater so that the voltage received by the controller 34 is within an acceptable range for the electronics to process.

As can be appreciated from FIG. 4, the controller 34 in this example includes an analog-to-digital converter 60, which is realized in an integrated circuit in one example. The heater voltage and current information is determined at 62. The controller 34 determines the resistance value of the blade heater (or heaters) required to achieve the desired heater temperature at 64.

When the zone of heaters is turned on, the voltage number obtained from the voltage sensor 56 in one example is divided by the current number provided by the current sensor to provide an initial resistance of the heater. The controller 34 uses stored data to determine a desired heater temperature rise based upon the current ambient temperature. Because the resistance coefficient of the heater material is known, the controller 34 is able to calculate the heater resistance that corresponds to the desired temperature change of the heater. The controller 34 then monitors the heater resistance and turns off power to the heater once the desired resistance and temperature are achieved.

At 66, the controller determines whether the current heater resistance value (based upon the measured voltage and current) is large enough such that the heater has reached the desired temperature. If not, the controller waits at 68 and then rechecks at a selected interval (less than one second, for example). Once the heater resistance value is large enough, a blade heater control portion 70 controls the power switch to turn off power to the heater.

A de-icing system designed according to this invention has significant advantages. The power delivered to the heaters is independent of the line voltage, the heater resistance tolerance and the accuracy of timers in the controller. The heaters are turned off once a desired temperature (indicated by the resistance) is achieved. Accordingly, there is less potential for runback water and more consistent de-icing performance. Sensing the ambient temperature compensates for many different system tolerance characteristics. Additionally, using a heater with a temperature coefficient of resistivity provides more rapid heating at colder ambient temperatures. With this invention, de-icing cycles can be shorter. Another advantage of this invention is that the amount of ice that must build up before de-icing is accomplished can be significantly less than prior art systems. Less ice build-up provides enhanced anticipated propeller performance.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of de-icing a propeller blade, comprising the steps of:

(A) determining an ambient temperature;

(B) determining a desired heater temperature based upon the ambient temperature; and (C) powering the heater to obtain a resistance of the heater that corresponds to the desired heater temperature.

2. The method of claim 1, including determining the resistance of the heater by monitoring a current flowing to the heater and a voltage drop across the heater.

3. The method of claim 1, wherein the heater comprises a material having a known coefficient of resistivity and using a predetermined relationship between heater resistance and temperature based upon the coefficient of resistivity.

4. The method of claim 1, including determining a desired change in heater temperature based upon the ambient temperature, determining a desired change in heater resistance corresponding to the desired change in heater temperature and monitoring the heater resistance to turn off power to the heater once the desired change has occurred.

5. The method of claim 1, including turning off power to the heater once the heater resistance corresponds to the desired heater temperature.

6. The method of claim 1, including heating a material of the propeller blade.

7. A propeller de-icing system, comprising:
   a heater comprising a material having a coefficient of resistivity that provides a predetermined relationship between heater resistance and heater temperature; and
   a controller that determines an ambient temperature and a desired heater temperature based upon the ambient temperature, the controller using the predetermined relationship and providing power to the heater until the resistance of the heater corresponds to the desired heater temperature.

8. The system of claim 7, including a temperature sensor that gathers ambient temperature information and communicates the information to the controller.

9. The system of claim 7, wherein the heater material comprises nickel.

10. The system of claim 7, wherein the controller determines a change in heater temperature needed to reach the desired heater temperature, determines a corresponding needed change in heater resistance and monitors the heater resistance until the needed change occurs.

11. The system of claim 10, wherein the controller turns off power to the heater once the desired resistance change has occurred.

12. The system of claim 7, wherein the controller turns off power to the heater once the heater resistance corresponds to the desired heater temperature.

13. The system of claim 7, wherein the heater heats a material of a propeller.

14. A propeller assembly, comprising:
   a plurality of propeller blades;
   at least one heater associated with each of the blades, each heater comprising a material having a coefficient of resistivity that provides a predetermined relationship between heater resistance and heater temperature; and
   a controller that determines an ambient temperature and a desired heater temperature based upon the ambient temperature, the controller using the predetermined relationship and providing power to at least selected ones of the heaters until the resistance of the selected hearers corresponds to the desired heater temperature.

15. The system of claim 14, including a temperature sensor that gathers ambient temperature information and communicates the information to the controller.

16. The system of claim 14, wherein the heater material comprises nickel.

17. The system of claim 14, wherein the controller determines a change in heater temperature needed to reach the desired heater temperature, determines a corresponding needed change in heater resistance and monitors the heater resistance until the needed change occurs.

18. The system of claim 17, wherein the controller turns off power to the heater once the desired resistance change has occurred.

19. The system of claim 14, wherein the controller turns off power to the heater once the heater resistance corresponds to the desired hearer temperature.

20. The system of claim 14, wherein oppositely positioned sets of the blades are grouped into zones and wherein the controller simultaneously controls power to the heaters in a selected zone.

21. The assembly of claim 14, wherein the heaters heat a material of the associated propeller blades.

* * * * *

UNITED STATES PATENT AND TRADEMARK OFFICE
CERTIFICATE OF CORRECTION

PATENT NO. : 6,753,513 B2
DATED : June 22, 2004
INVENTOR(S) : Goldberg et al.

It is certified that error appears in the above-identified patent and that said Letters Patent is hereby corrected as shown below:

<u>Column 6,</u>
Line 14, "hearers" should read as -- heaters --
Line 30, "hearer" should read as -- heater --

Signed and Sealed this

Third Day of August, 2004

JON W. DUDAS
*Acting Director of the United States Patent and Trademark Office*